INVENTORS
EDWARD J. MARCINIK
HERMAN H. WOLF
BY
William R. Nolte
AGENT

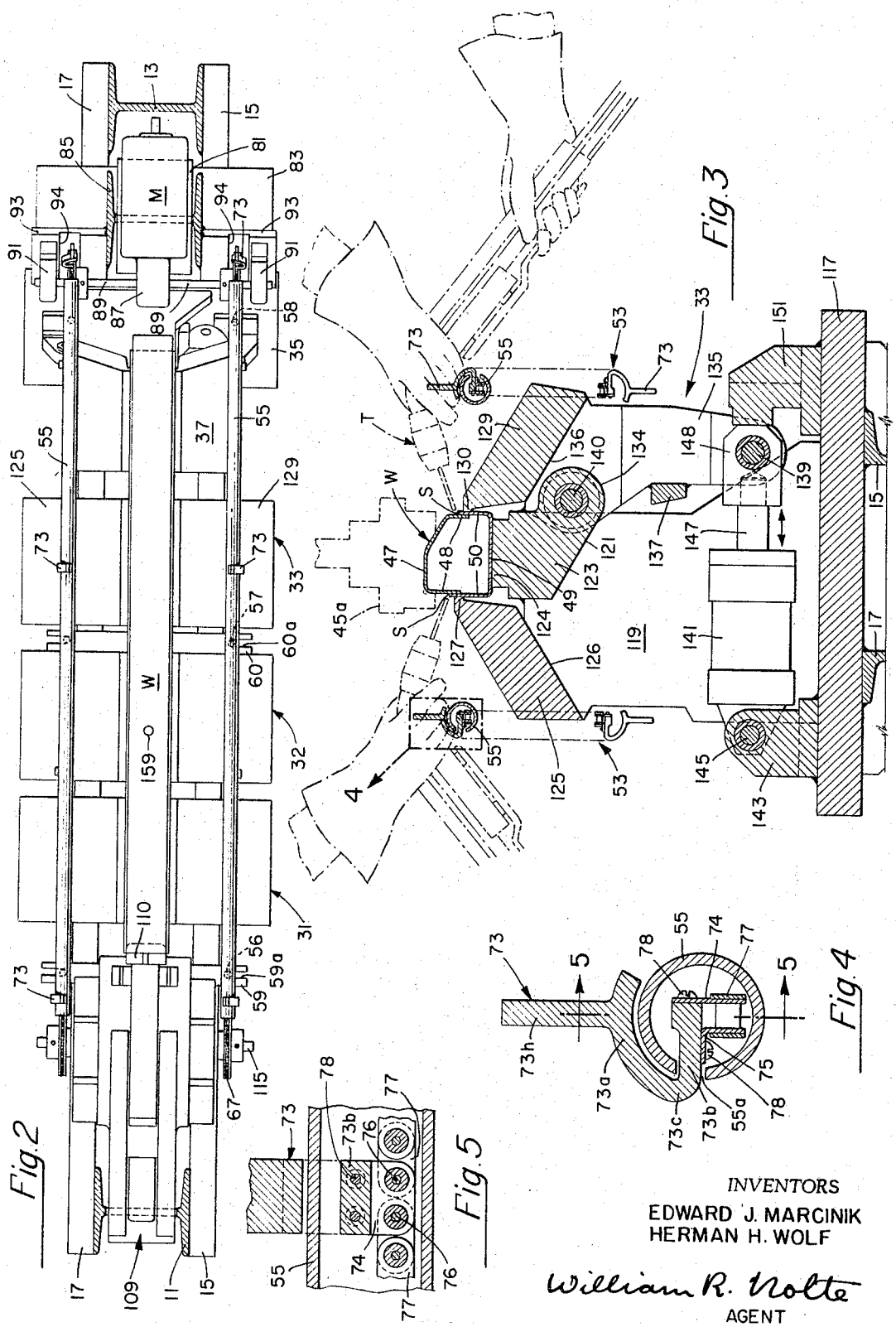

United States Patent Office 3,333,755
Patented Aug. 1, 1967

3,333,755
APPARATUS FOR SEMI-AUTOMATIC WELDING
Edward J. Marcinik, Jenkintown, and Herman H. Wolf, Philadelphia, Pa., assignors to The Budd Company, Philadelphia, Pa., a corporation of Pennsylvania
Filed Feb. 10, 1965, Ser. No. 431,583
6 Claims. (Cl. 228—25)

This invention relates to apparatus for semi-automatic welding and more particularly to apparatus for guiding an operator-held tool during a welding operation.

Two types of welding which have previously been employed in the manufacture of chassis frame for automobile bodies, and other similar structures use $CO_2$ gas shield and automatic wire feed. In so-called semi-automatic welding, an operator-held tool or welding gun is used which automatically feeds the wire and provides the gas shield. The gun is tediously manipulated through the path of the weld by the operators. This form of welding imposes certain problems in that it is necessary for the operator to be most vigilant in controlling the speed of the welding gun and also to properly control its path of travel. With respect to automatic welding, the path of the weld and its speed of application are controlled by cams and preset memory or electronic equipment. Thus control of the latter is accomplished by employing very expensive and high maintenance cost equipment.

It is an object of this invention, therefore, to provide an improved apparatus for guiding an operator-held welding tool which avoids one or more of the disadvantages of the prior art arrangements.

It is a further object of this invention to provide an improved apparatus which enables the operator to guide a hand-held tool and thereby enable him to concentrate on minor deviations in the path of the weld.

In accordance with the invention, the apparatus comprises means for guiding a hand-held tool such as a welding gun in order to join two metallic bodies together along a common line of jointure. The apparatus includes support means for holding or clamping the work which is to be welded together. Guide and transport means are provided to guide the operator's hand with a welding gun at a controlled speed and through a given path. The path corresponds to, or matches the line of weld to be applied to the work. The guide and transport means may include a stationary rail or track with movable feed means for manual engagement by the operator. Drive means are also provided to control the speed of movement of the feed means.

For a better understanding of the invention, together with other and further objects thereof, reference is had to the following description taken in connection with the accompanying drawings and its scope will be pointed out in the appended claims.

In the drawing:

FIG. 2 is a plan view partly in section of the fixture shown in FIG. 1 taken along line 2—2 of FIG. 1.

FIG. 3 is a vertical section taken along line 3—3 of FIG. 1 illustrating the clamping means and welding operation.

FIG. 4 is a sectional view of the guide rail greatly enlarged as shown in the enclosed area designated as the numeral 4 in FIG. 3.

FIG. 5 is a sectional view taken along line 5—5 of FIG. 4.

Figure 1:
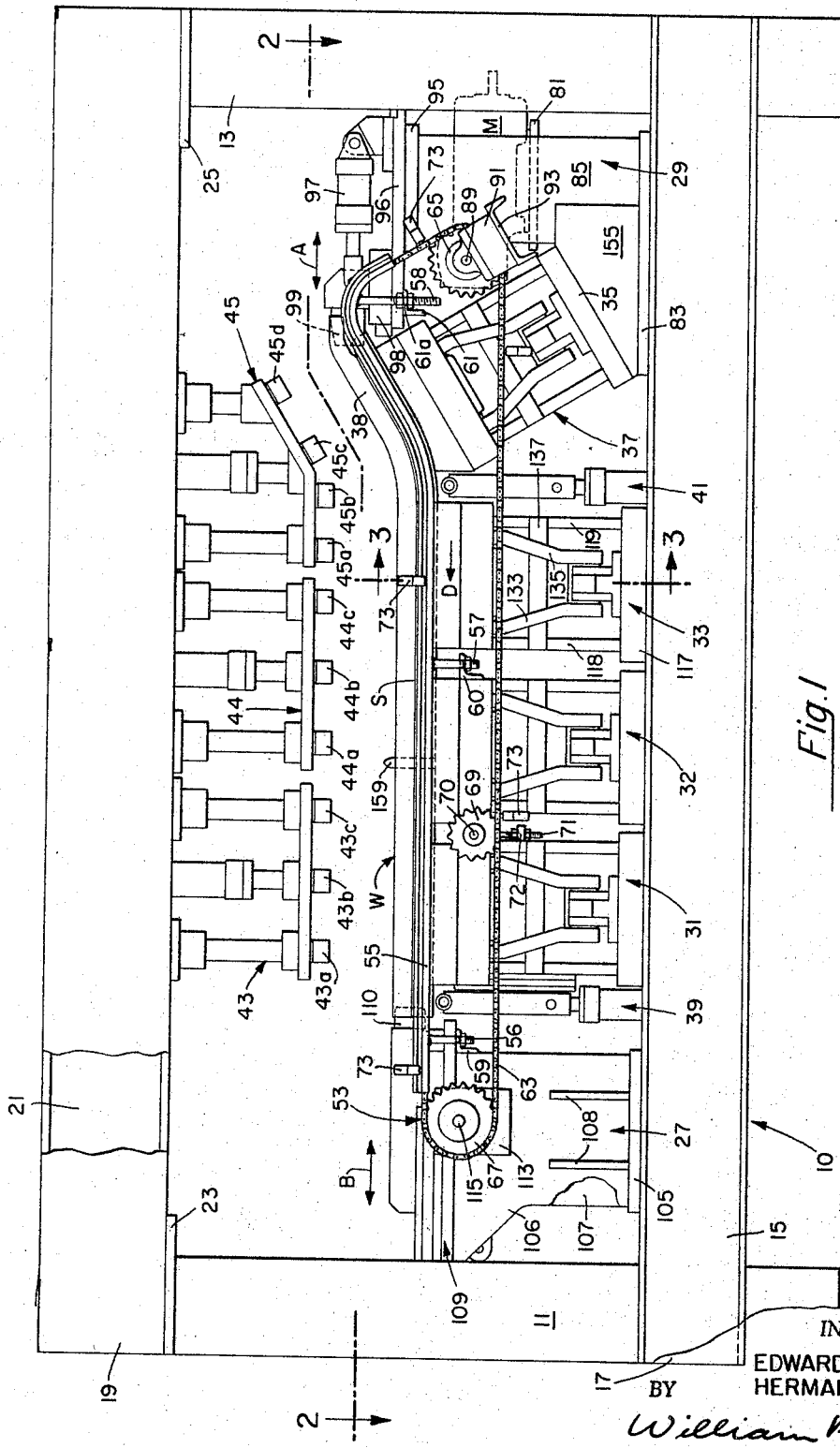
FIG. 1 is a front elevational view of the welding fixture for semi-automatic welding.

Although the principles of this invention may be advantageously employed in various circumstances, in order to illustrate the invention, a fixture has been selected which has been especially designed for use in the mass production of chassis frames for automobile bodies. More particularly, the fixture is adapted to enable the operators to weld a plurality of parts of a chassis frame together to form a unitary construction and accomplishes this result with increased speed and quality.

In general, the fixture is designed and arranged so that the operators may stand on opposite sides of the fixture to enable them to simultaneously apply weld deposits to opposite seams of the chassis components.

With the above in mind, reference is now made to the drawings wherein it is noted that the apparatus of the present invention is supported within a generally rectangular jig or frame 10. The frame is composed of a pair of vertically disposed end frame members 11, 13 each in the form of a wide flanged H-beam. A pair of lower horizontally disposed channel members 15, 17 may be welded on opposite sides of the vertical members and a like pair of upper horizontally disposed channel members 19, 21 are supported on cap plates 23, 25 secured on the tops of the vertical posts 11, 13 respectively.

A front plug gauge assembly 27, and a rear plug gauge assembly 29, are supported across the top surfaces of the lower horizontally disposed beams 17 at opposite ends thereof between vertical posts 11 and 13. A plurality of chassis component clamping assemblies 31, 32, 33 are likewise supported on the top surfaces of the lower horizontal frame members and are disposed between the front and rear plug gauge assemblies 27, 29 to support an elongated composite workpiece W. The rear plug gauge assembly 29 includes an inclined transversely extending table portion 35 to support clamping assembly 37 in a manner to grip the rearwardly extending, upwardly curved portion 38 of workpiece W and so as to be positioned therealong between the horizontally disposed clamp assembly 33 and the plug gauge assembly 29. A front ejector assembly 39, and a rear ejector assembly 41, the former disposed between the plug assembly 27 and clamp assembly 31, and the latter disposed between clamp assemblies 33 and 37, are likewise suitably secured across the top surfaces of horizontally disposed beams 15, 17. The assemblies function to raise the workpiece W after the welding operation thereon has been accomplished, and thereby enable its removal to permit the insertion of a new, unwelded, workpiece.

Hydraulically operated rams 43, 44, 45 are suitably supported to depend from the upper horizontal disposed frame members 19, 21 to cooperate with clamp assemblies 31, 32, 33 and 37 therebeneath. The rams may be lowered to contact the upper portion of workpiece W, as seen in FIG. 3. It can be noticed that each of the rams is positioned in a fore and aft direction so as to lie opposite a pair of the clamping assemblies therebeneath. Thus ram 43 is so disposed as to cooperate in clamping arrangement with clamping assemblies 31 and 32. More specifically, the clamping blocks 43a, 43b cooperate with clamping assembly 31, while clamping block 43c lies opposite and cooperates with clamping assembly 32. In a similar manner clamping blocks 44a, 44b cooperate with clamping assembly 32 while its remaining block 44c cooperates with clamping assembly 33, while in addition blocks 45a, 45b of ram assembly 45 cooperate with clamp assembly 33 and the remaining upwardly inclined clamps 45c, 45d thereof cooperate with the inclined clamp assembly 37 to suitably grip the upwardly curved portion of 38 of the workpiece W.

Referring now to FIG. 3 it is seen that the previously referred to composite workpiece W consists of an upper metallic body 47 of channel configuration having downwardly depending flanges 48 and a lower metallic body 49. The latter includes upwardly extending flanges 50 which engage the outer surfaces of the downwardly depending flanges 48 to define weld seams along a common line of jointure therewith and generally indicated by reference character S. The seams are adapted to receive a deposition of weld material therealong from a welding tool T held in the hands of an operator as indicated in phantom lines.

In order to facilitate the application of weld material along the interface or common boundary of the flanges of the upper and lower metallic bodies a guide and transport mechanism 53 is provided. Since the latter mechanism is duplicated on opposite sides of the jib 10, the following discussion will for purposes of simplicity be limited to that contained on one side of the apparatus. The mechanism 53 includes a stationary guide 55 of hollow cylindrical form and whose longitudinal axis conforms throughout its length with the interface or seam S of the two bodies. A plurality of threaded vertical adjusting rods 56, 57, 58, FIG. 1, spaced along the length of the guide and affixed in depending relation therefrom is suitably received in supporting brackets 59, 60 and 61 respectively, to support the guide in opposed parallel spaced relationship with seam S. The supporting brackets 59, 60, 61 include elongated slots 59a, 60a, 61a, respectively and which extend transversely to the main axis of the apparatus to enable the apparatus to be shifted in a horizontal direction either closer or spaced farther away from said axis. The distance of the guide from seam S may thus be adjusted to an amount to enable the operator with welding tool T held in his hand and with wire automatically fed from its tip to conveniently reach the seam S while maintaining sliding engagement along the top surface of the guide.

In order to so move the hand-held tool simultaneously along the guide and the seam S a sprocket chain 63 is threaded through the hollow guide 55. The chain is driven by sprocket 65 at one end and is supported for movement through the guide at its other end by idler sprocket 67. A tensioning sprocket 69 mounted on stub pivot shaft 70, the latter being integral with threaded rod 71, is provided to vary the tension in the chain 63 by suitably raising or lowering rod 71 relative to its supporting lug-like bracket 72.

Referring now to FIGS. 1, 4 and 5 it is observed that sprocket chain includes a plurality of hand engaging posts 73 carried at spaced intervals along the length of the chain. Each post 73 includes a generally U-shaped base portion 73c comprising arms 73a, 73b. The lower arm 73b extends horizontally within the slot 55a contained within the side wall of the hollow cylindrical guide member 55. The other arm 73a thereof curves over the top surface of the guide and includes an upright extension 73h. Link plate 74 and link bracket 75, the latter of right angle configuration, are suitably secured to the chain as by a pair of pivots 76 and side sprocket links 77. The horizontal portion of link bracket 75 is secured to the undersurface of arm 73b of the post 73 by screws 78 while link plate 74 is of sufficient height to enable the same to abut the tip of said arm 73b and is also secured by screws 78.

With reference now to FIGS. 1 and 2, it is observed that a variable speed motor M is provided to control the movement of chain 63 at a predetermined speed and is suitably mounted on a horizontal supporting plate 81. The plate may be fixed as by welding to the previously referred to rear plug guage assembly 29. The assembly includes a base plate 83 and an upstanding wide flanged H-beam 85 secured thereto. The interior web of the beam is suitably cut away to receive as by welding the motor mounting plate 81. The motor M delivers power to a gear box 87 through which extends a sprocket shaft 89 which carries the aforementioned drive sprockets 65 which are suitably keyed thereto. The outer ends of the shaft are journalled for rotation in pillow blocks 91 carried upon C-channel sections 93 which are suitably affixed to project normally to the outer flange faces of the aforementioned H-beam 85. The C-channel sections include elongated cut-outs 94 to permit the passage of the manual hand grip posts 73 attached to transport chain 63 therethrough. The top edges of the flanges of the H-beam 85 carry a first plate 95, and a second plate 96, to provide a table surface for the hydraulic actuating unit 97. The unit includes a bearing block 98 to accommodate reciprocation of the rear plug guage 99. The plug is shown received within the open end formed by two metallic bodies in their assembled position. Actuation of the hydraulic unit 97 is effective to slide the plug guage 99 in a fore and aft direction as indicated by the arrow (A) to either enter the open end of the composite workpiece W or to be retracted therefrom. The lower surface of the aforementioned plate 96 is shown extended to receive the aforementioned supporting bracket 61 to hold the threaded supporting rod 58 of the guide member 55.

The forward plug guage assembly 27 likewise includes a transversely disposed plate 105 disposed across the top surface of the horizontally disposed lower beams 15 and 17 of the frame. A pair of vertical plates 106, 107 is supported in upstanding parallel spaced relationship upon plate 105 by gussets 108. The top edges of the plates 106 and 107 also receive a slide assembly 109 which carries the forward plug guage 110. For clarity of illustration, its hydraulic actuator is not shown but is similar to the previously referred to hydraulic actuator 97 of the rear plug guage 29. Plug guage 110 may be actuated in the direction of arrow (B) to either be extended within the opposite open end of the workpiece W, or to be retracted therefrom. The upstanding vertical plate 106 carries a smaller base plate 113 which in turn supports a stub shaft 115 about which the previously referred to idler sprocket 53 is rotated. The edge surface of plate 106 likewise carries bracket 59 to provide support for the previously mentioned threaded rod 56 to support the forward end of the guide 55.

Referring now to FIGS. 1 and 3 it is seen that the workpiece clamping assembly 33 consists of a base plate 117 and a pair of upstanding end plates 118, 119 secured thereon in a fore and aft direction. The plates are notched along their top edges and beneath the workpiece W as at 121 to receive a bed support 123 which along its top surface 124 engages the lowermost channel member 49 of the workpiece. A stationary side clamp 125 also extends between the inclined edges 126 of the end plates 118, 119 and includes an edge 127 to engage the outside surface of one of the upstanding flanges 50 of lower workpiece 49. A similarly shaped movable clamp 129 having a reduced lip-like edge 130 is provided to engage the other opposite upstanding flange 50 of the lower workpiece. In order to enable movement of the clamp a pair of clamp levers 133, 135, FIG. 1, is provided and includes top edges 136 to which the clamp member 129 is rigidly secured. The previously referred to central bed support 123 includes enlarged ears or bosses 134 to receive pivot shaft 140, the levers 133, 135 having suitable apertures to be received and supported for rotation about the shaft. As seen in FIG. 1 the levers are spread apart at their top portions and converge to a closer spacing at the level where they are both fixedly joined to cross member 137 which extends horizontally across their inner edges. The lower portions of the members 133 and 135 are disposed in parallel relationship and are joined by a lower pivot shaft 139. A hydraulic actuator unit 141 is provided to actuate the levers and has one of its ends pivotally secured to upstanding brackets 143 by pivot 145. The bracket may be suitably affixed as by welding to the base plate 117. An actuator rod 147 of the unit extends from the other end of the actuator and carries at its extremity an apertured block 148 through which is passed the aforementioned pivot shaft 139. By suitable operation of actuator 141 the levers 133, 135 may be rotated about pivot shaft 140 to either clamp the workpiece W therebetween or to release the same to permit insertion of a new workpiece therein. It will be observed that the previously mentioned cross member 137 will limit the clockwise rotation of the levers about shaft 140. In order to limit the rotation of the levers in a counterclockwise direction stops 151 affixed to the top surface of the base plate 117 are provided to strike the pivot block 148.

While the above description has been confined to the clamping assembly 33, it should be understood that clamping assemblies 31, 32 and inclined clamping assembly 37 are similar in principle and construction. It will be noted that with respect to clamping assembly 37 that its base plate 35 is received upon the top inclined edges of wing plates 155 which are affixed in facing engagement with the outside surfaces of the upstanding flanges of the H member 85.

In operation the front and rear plug gauge assemblies are actuated to their retracted open non-operative positions as are the clamping assemblies 31, 32, 33 and 35, to enable the lower workpiece 49 to be placed on the bed members 123 of the clamping assemblies. It will be noted that lower workpiece 49 is placed so that its side flanges 50 are in an upright position. Thereafter, the top workpiece 47 is aligned so that its downwardly depending flanges 48 are received within and embraced by the upstanding flanges 50. As seen in FIG. 1, the clamping assembly 32 moreover includes an indexing pin 159 which is passed through suitable aligning apertures contained within the workpieces 47 and 49 to thereby align the same in a fore and aft direction. Plug gauge assemblies 27 and 29 are then actuated to cause their respective gauges 110 and 99 to enter the opposite openings formed by the top and bottom workpieces. Thereafter, the upper hydraulic rams 43, 44 and 45 are suitably actuated to lower the same and to apply pressure to the top surfaces of the workpiece 47 to cause the same to be suitably aligned in a vertical direction. As seen in FIG. 3 clamp element 45a is shown in its lowered position as indicated by the phantom line illustration thereof. With the workpieces so clamped in a vertical direction, the clamping assemblies 31, 32, 33 and 37 are thereafter actuated to cause the lip portions 127 and 130 of clamps 125 and 129 respectively to suitably grip the side edges of the workpiece to restrain the same in a lateral direction. With the upper and lower workpieces so assembled the outer edge of the upright flanges 50 of workpiece 49 defines a common line of jointure with the outer surfaces of downwardly depending flanges 48 to constitute a line for the deposition of weld material therealong. As previously stated, the guide member 55 corresponds in configuration to the seam S. Depending upon the type of metal of the workpieces to be welded, the operator selects an appropriate speed for the motor M of the transport mechanism to move the transport chain 63 which carries the manual posts 73. Thereafter, the operator, with welding tool in hand and in manual contact with the posts 73 and moreover with the tip of the welding tool aligned so that the wire is adjacent the aforementioned seam S, may commence to apply the weld material to the seam S. As seen in FIG. 1, the direction of rotation is in a counterclockwise direction as indicated by the arrow D, thus the operator may start welding at the upper or higher curved portion of the seam as indicated by reference character 38 and follow the seam downwardly to the horizontal portion of the workpiece. Alternatively, the operator may place his hand containing the welding tool in light contact with the top surface of the guide so that the post 73 urges his hand in sliding contact along said top surface. It will be appreciated that the apparatus above described eliminates the disadvantages associated with previously employed semi-automatic welding devices by actually controlling the weld tool T at a given lineal speed and through a predetermined path as limited by the slot 55a contained in the stationary guide member 55. The operator being relieved of this speed and path control is enabled to visually examine and concentrate on minor variations in the path of the weld and is thereby further enabled to produce superior welds at much greater speeds than have been achieved heretofore. Although the above described embodiment of the invention is applied to a welding apparatus, it is to be understood that the invention may also be applied to any basic hand operation of a repetitive nature, such as: grinding, soldering, burning, deburring, etc.

In conclusion while there has been described what is at present considered to be a preferred embodiment of the invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. Apparatus for guiding a manual operator-held welding tool in order to join two metallic bodies together along a common line therebetween, comprising in combination, support means for holding said two metallic bodies together, stationary means providing a guide surface having the same configuration as said common line and spaced in parallel relationship thereto, and manually engageable feed means movable along said guide surface for providing a guide for an operator's hand which holds the welding tool.

2. Apparatus for guiding a manual operator-held welding tool in order to join two metallic bodies together along a common line therebetween, comprising in combination, support means for holding said two metallic bodies together, stationary means spaced in parallel relationship to said common line, said stationary means including an elongated slot of the same configuration as said common line, and manually engageable feed means movable in parallel relation relative to said common line and along said elongated slot for providing a guide for an operator's hand which holds the welding tool.

3. Apparatus for guiding a manual operator-held welding tool in order to join two metallic bodies together along a common line therebetween, comprising in combination, support means for holding said two metallic bodies together, hollow elongated stationary means supported in parallel relationship to said common line, said stationary means including a slot of the same configuration as said common line, feed means movable within said hollow elongated stationary means, said feed means including manually engageable support means secured thereto for cooperative engagement with said slot, said support means providing a guide for an operator's hand to thereby move said welding tool relative to said common line.

4. Apparatus for guiding a manual operator-held welding tool in order to join two metallic bodies together along a common line therebetween, comprising in combination, support means for holding said two metallic bodies together, hollow elongated stationary means supported in parallel relationship to said common line, said stationary means including a slot of the same configuration as said common line, feed means movable within said hollow elongated stationary means, manually engageable port means secured to said feed means and extending externally of said stationary means for providing a guide for an operator's hand to thereby move said welding tool relative to said common line, and means for driving said feed means at a predetermined lineal speed.

5. Apparatus for guiding a manual operator-held welding tool in order to join two metallic bodies together comprising in combination, support means for holding one of said bodies, pressure means for urging said second body into engagement with said first body to define a common line of jointure therebetween, guide means supported in opposed, spaced relationship relative to said bodies, said guide means including stationary means comprising a hollow cylindrical member having a slot disposed along its jointure and disposed in parallel relationship thereto, endlength of the same configuration as said common line of less chain means mounted for movement through said hollow cylindrical member, a plurality of post means secured at spaced intervals along the length of said chain means and movable through the slot in said cylindrical member, and means for actuating said chain means at a predetermined rate of speed whereby said operator upon manual engagement of said post means with welding tool in hand and with the latter appropriately aligned and spaced relative to said common line of jointure is enabled to weld the two metallic bodies along said common line at a predetermined lineal speed.

6. Apparatus for guiding a manual operator-held welding tool in order to join two metallic bodies together, comprising in combination, support means for holding one of said bodies, pressure means for urging said second body into engagement with said first body to define a common line of jointure therebetween, guide means supported in opposed, relationship to said bodies, said guide means including stationary means comprising a hollow cylindrical member slotted along its length and of the same configuration as said common line of jointure and disposed in parallel relationship thereto, endless chain means mounted for movement through said hollow cylindrical member and along its length, a plurality of post means secured at spaced intervals along the length of said chain means and movable therewth, said post means being shaped and of a length to pass through the slotted portion at said cylindrical member during such movement, and means for actuating said chain means at a predetermined rate of speed whereby said operator upon manual engagement of said posts means with welding tool in hand and with the latter appropriately aligned and spaced relative to said common line of jointure is enabled to weld the two metallic bodies along said common line at a predetermined lineal speed.

References Cited

UNITED STATES PATENTS

| 2,827,547 | 3/1958 | Tiedemann | 219—125 |
| 2,827,548 | 3/1958 | Griswold | 219—125 |
| 3,117,217 | 1/1964 | Granberg | 219—137 |

JOHN F. CAMPBELL, *Primary Examiner.*

M. L. FAIGUS, *Assistant Examiner.*

UNITED STATES PATENT OFFICE
CERTIFICATE OF CORRECTION

Patent No. 3,333,755                                              August 1, 1967

Edward J. Marcinik et al.

It is hereby certified that error appears in the above numbered patent requiring correction and that the said Letters Patent should read as corrected below.

Column 6, lines 74 and 75, strike out "jointure and disposed in parallel relationship thereto, end-length of the same configuration as said common line of" and insert instead -- length of the same configuration as said common line of jointure and disposed in parallel relationship thereto, --.

Signed and sealed this 18th day of June 1968.

(SEAL)
Attest:

Edward M. Fletcher, Jr.                                       EDWARD J. BRENNER
Attesting Officer                                                         Commissioner of Patents